April 29, 1930.  G. W. SWIFT, JR  1,756,223
CUTTING MECHANISM
Filed Aug. 21, 1928   10 Sheets-Sheet 6

Inventor
GEORGE W. SWIFT, JR.

WITNESS
By his Attorneys

Inventor
GEORGE W. SWIFT, JR.

WITNESS
Oliver W. Holmes

By his Attorneys
Knight Bros.

April 29, 1930.  G. W. SWIFT, JR  1,756,223
CUTTING MECHANISM
Filed Aug. 21, 1928  10 Sheets-Sheet 8

WITNESS

INVENTOR.
George W. Swift, Jr.
By Knight Bros.,
ATTORNEYS.

Patented Apr. 29, 1930

1,756,223

UNITED STATES PATENT OFFICE

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY

CUTTING MECHANISM

Application filed August 21, 1928. Serial No. 301,041.

This invention relates more especially to mechanisms for cutting off successive portions or sections of substantially the same length from a web which may be delivered thereto at various different speeds. In machines of this character which are intended to be operated at various different speeds and in which the size of successive portions or sections to be severed from the web are to be of substantially the same length, it is necessary to provide suitable means for advancing the time action of the cutting-off mechanism when the speed at which the web is fed thereto is increased and for retarding the time action of said cutting-off mechanism when the movement of said web is slowed down.

The primary object of my invention is to provide suitable mechanism embodying an improved construction and arrangement of parts whereby the time action of the cutting-off mechanism in machines of this character may be automatically advanced when the movement of the web is speeded up and retarded when the movement of said web is slowed down.

One of the objects of my invention is to provide mechanism of improved construction whereby successive sections or portions of substantially the same length may be cut from a web irrespective of the speed at which said web is delivered thereto. For this purpose, my invention contemplates improved operating connections between a web-actuated gauge and the cutting blades, said operating connections including relatively adjustable parts which are under the direct control of the variable speed transmission through which power is delivered to the web-cutting blades.

Another object of my invention is to provide an improved mechanism for controlling the operation of an intermittently active clutch which determines the active periods of normally-inactive web-cutting blades which are under the control of trip mechanism directly responsive to speed variations in the web-feeding mechanism.

Other and more particular objects of invention will be explained in the specification and the several elements to which they relate will be recited in the appended claims.

In the accompanying drawings, which exemplify my invention in a preferred embodiment, Figures 1 and 1ª together show a side elevation of a web-cutting machine provided with my improved mechanism for adjusting the time action of the web-cutting blades;

Figure 3 is a fragmentary top plan view of portions omitted from the upper left-hand portion of Figure 2ª;

According to the embodiment of my invention shown on the drawings, a continuously moving web is fed between suitable web-cutting blades which are arranged askew on intermittently operated rolls, the operation of said blades being under the control of suitable means which vary their time actions to correspond with changes in speed at which the continuously moving web is delivered to the web-cutting blades.

Variable speed power unit

Figure 1:
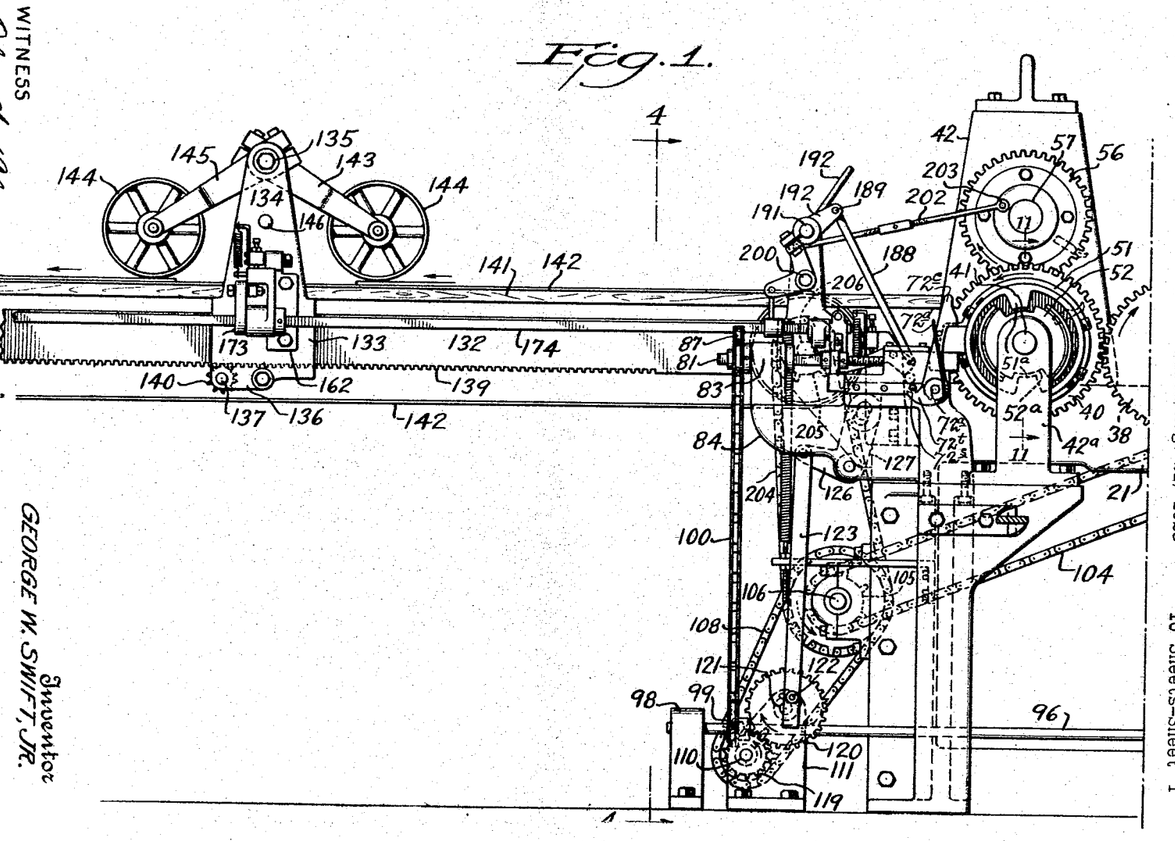
Figure 1A:
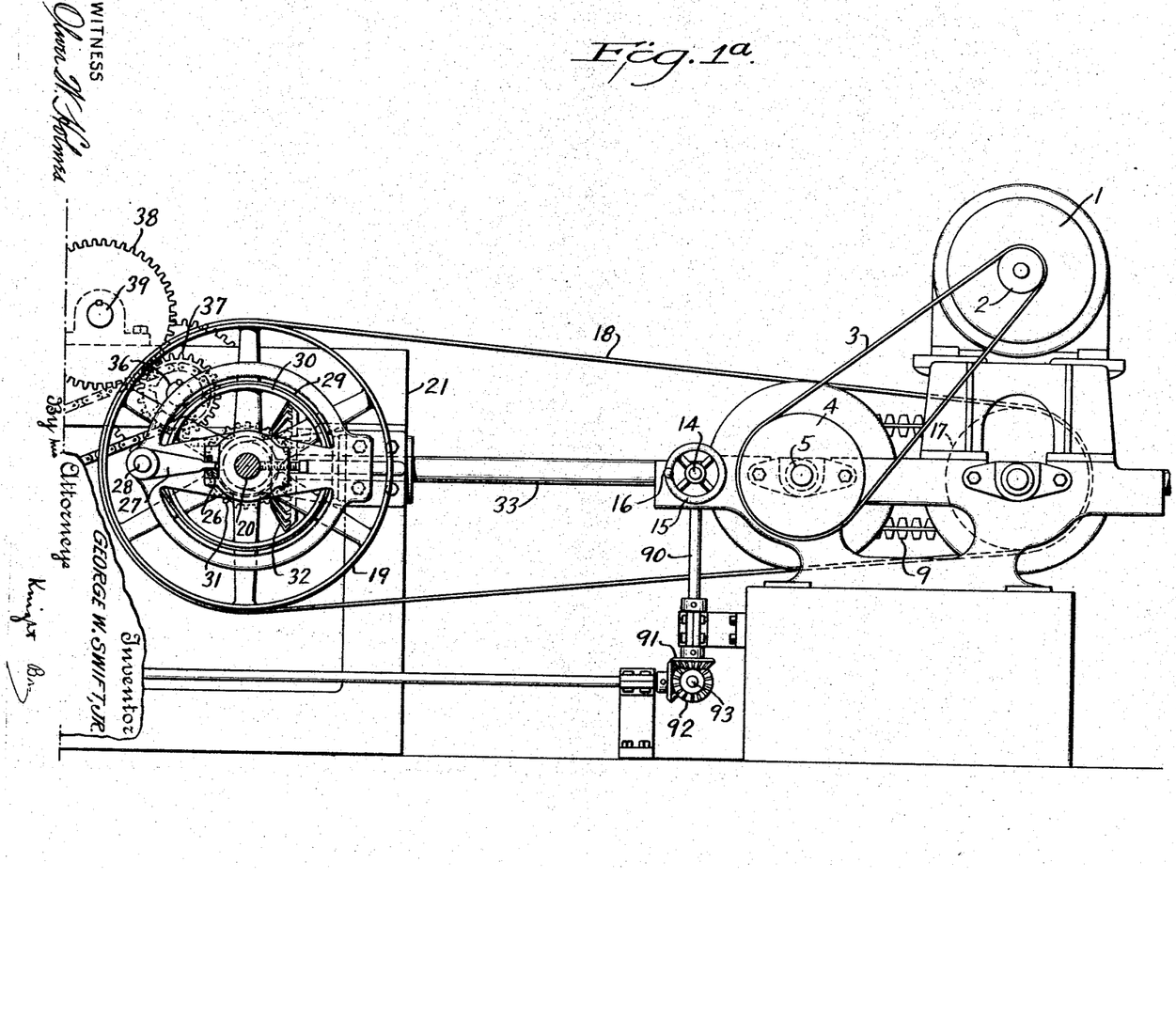
Figure 2:
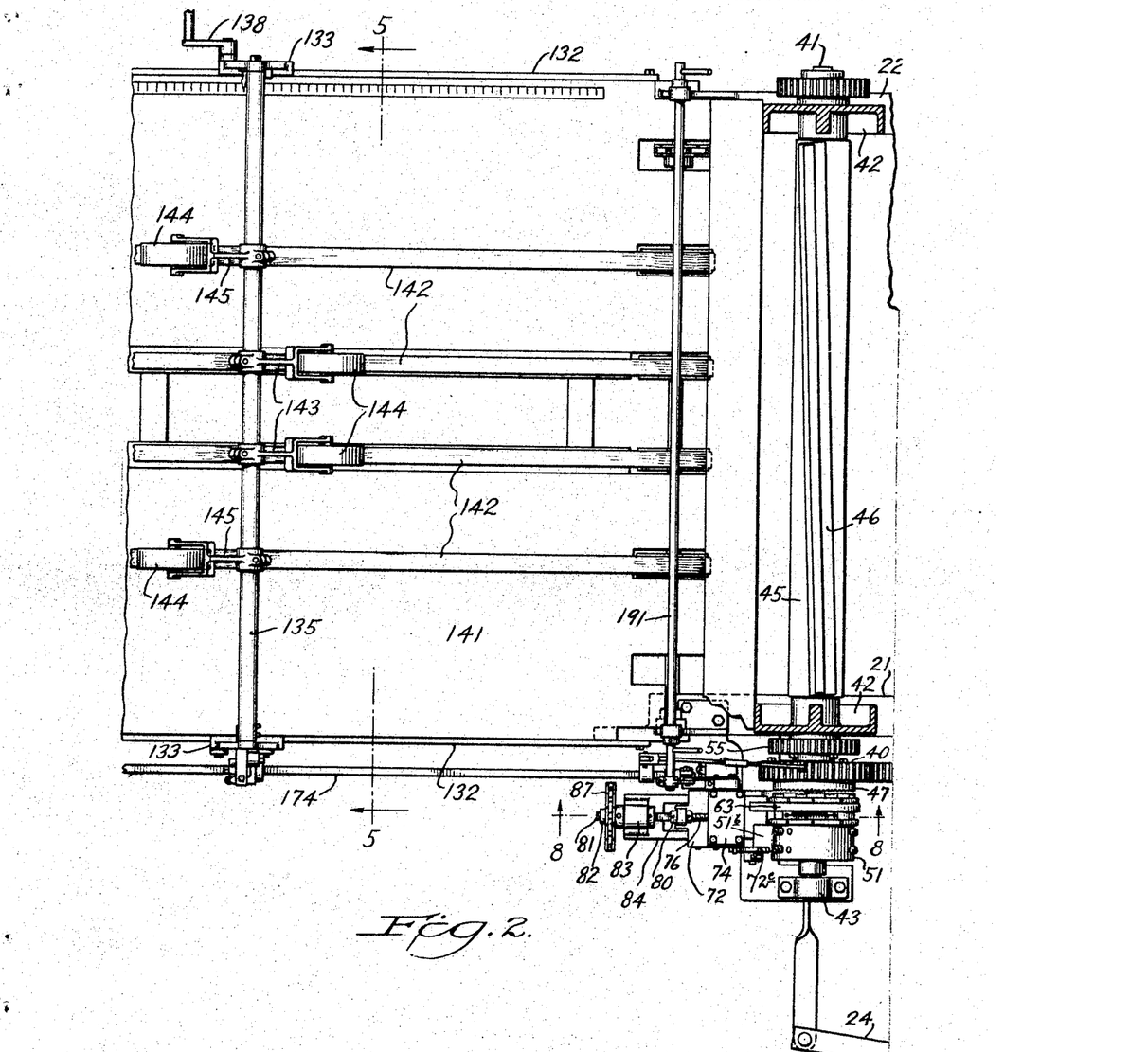
Figures 2 and 2ª together show a top plan view of the same, parts being broken away and parts shown in section.
Figures 2A, 3:
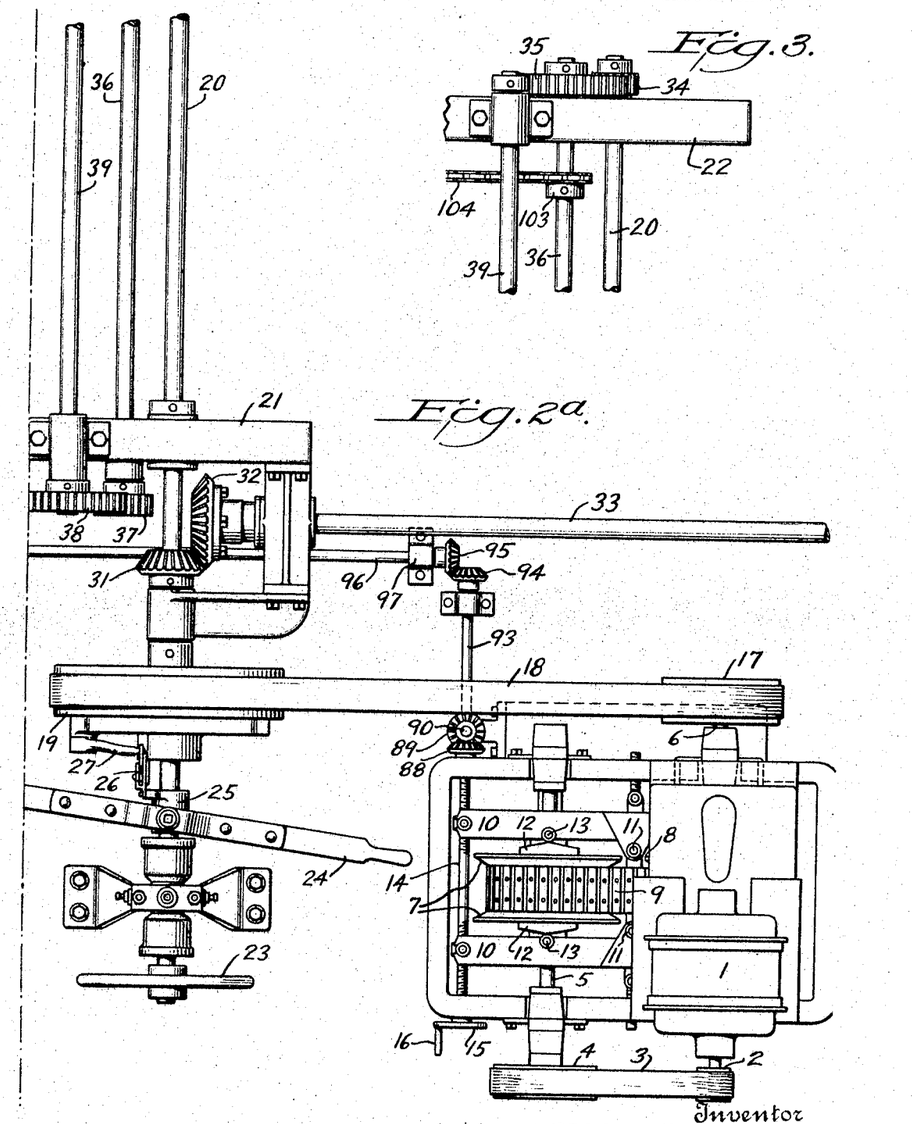

Referring more especially to Figures 1a and 2a of the drawings, the web-feeding mechanism may be driven by a power unit including a variable transmission adapted to be regulated by hand for varying the speed derived from a motor or other source of power. For this purpose, a motor 1 may be supported on a suitable frame above the variable transmission mechanism, said motor being provided with a drive pulley 2 connected by belt 3 with a pulley 4 mounted on a shaft 5. The shaft 5 may be connected to a variable speed shaft 6 by means of a well-known form of variable transmission comprising two pairs of oppositely arranged cone-disks 7—7 and 8—8 which are splined in pairs to their respective shafts. The relatively adjustable cone-disks 7—7 on the drive shaft 5 are connected by a V-belt 9 to the cone-disks 8—8 on the variable speed shaft 6. The cone-disks on each shaft may be adjusted toward and away from each other at the same time that the corresponding cone-disks on the other shaft are moved in opposite relative directions by means of two oppositely arranged levers 10 which are pivotally mounted at 11, 11 respectively. The adjustments of the cone-disks 7—7 and 8—8 are accomplished by means of oppositely arranged thrust equalizing collars 12 which are pivoted at 13 to the levers 10. Suitable means for adjusting the levers 10 relatively to each other reside in a screw 14 provided with right and left hand screw threads respectively engaging said levers. Said screw is provided at one end with a hand-wheel 15 which carries a handle 16, the arrangement being such that an adjustment of the hand-wheel 15 varies the speed transmitted to the variable speed shaft 6. Mounted upon the shaft 6 is a driving pulley 17 which is connected by a belt 18 to a driven pulley 19, said driven pulley being freely journalled on a transverse shaft 20 which is journalled in suitable bearings carried by the side frame 21 and 22 of the machine. The transverse shaft 20 is provided with a hand-wheel 23 and a clutch shift lever 24 for throwing a clutch-operating sleeve 25 which is splined to shaft 20. The sleeve 25 is provided with a suitable cam slide connection 26 to the free end of a crank arm 27 as shown in Figure 1a, said crank arm being carried by a rock shaft 28 which operates to contract and expand a clutch band 29 with respect to a cylindrical drum 30, said drum being rigidly connected to the driven pulley 19. Keyed to the shaft 20 is a beveled pinion 31 which meshes with a beveled gear 32 mounted on a longitudinal shaft 33, said shaft being arranged to deliver power to the web feeding mechanism which is adapted to deliver a continuous web to the web-cutting mechanism at variable speeds depending upon the adjustment of the variable speed transmission.

As shown in Figure 3, the shaft 20 carries at its far end a spur pinion 34 which meshes with a spur gear 35 keyed to one end of an intermediate shaft 36. Referring back to Figure 2a, the other end of shaft 36 carries a spur pinion 37 which meshes with a spur gear 38 keyed to another transverse shaft 39. As shown in Figures 1 and 1a, the spur gear 38 meshes into another spur gear 40 which is keyed to a lower cutter shaft 41, said lower cutter shaft being journalled in oppositely arranged uprights 42 mounted on the opposite side frames of the machine.

Clutch mechanism

Figure 8:
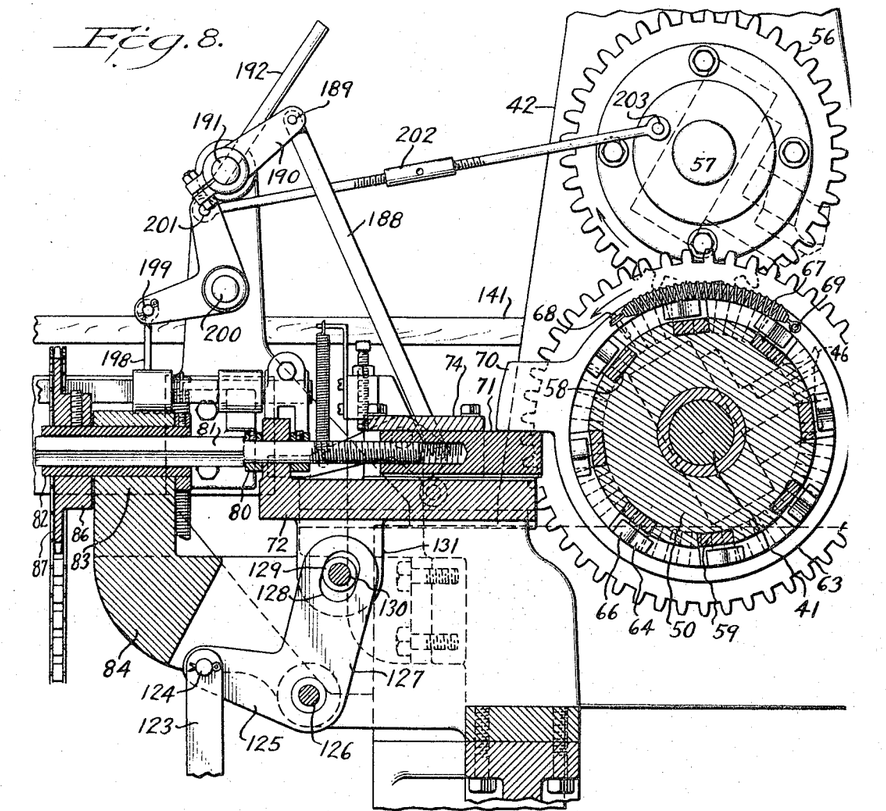
Figure 8 is an enlarged vertical section on the line 8—8 of Figure 2.
Figure 9:
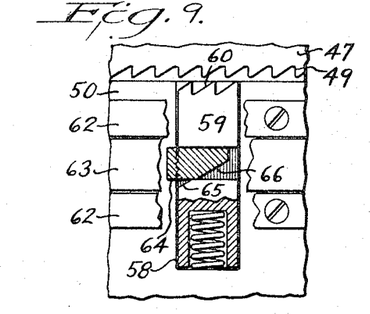
Figure 9 is a fragmentary detail section corresponding to the line 9—9 of Figure 11.
Figure 10:
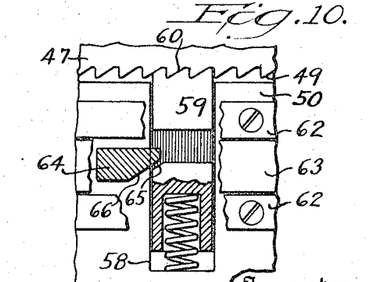
Figure 10 is a view similar to Figure 9 with the parts in changed positions.
Figure 11:
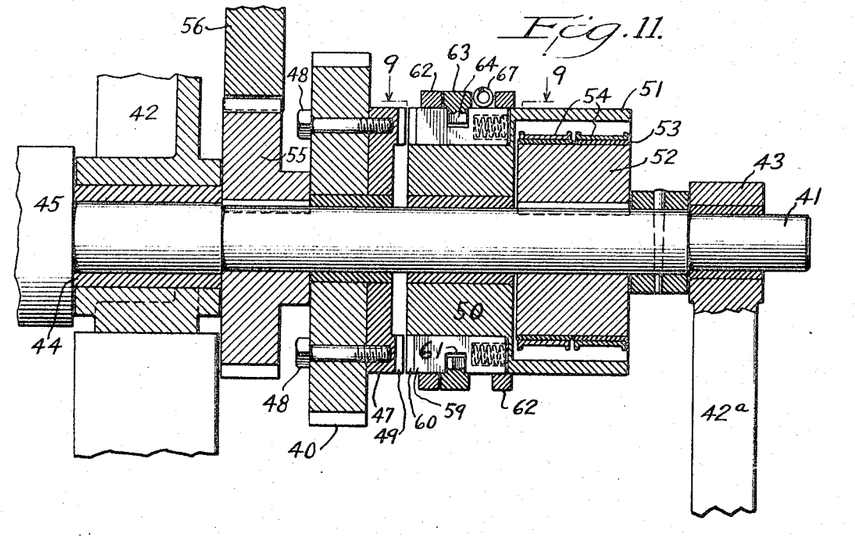
Figure 11 is an enlarged axial section on the line 11—11 of Figure 1, parts being shown in elevation.
Figure 12:
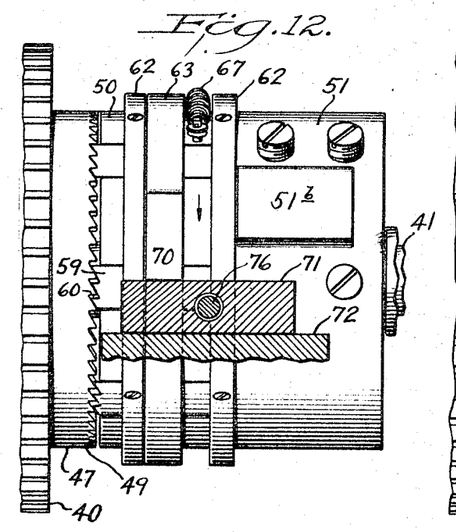
Figure 12 is an enlarged side elevation of the right-hand portion of Figure 11, parts being shown in section.
Figure 13:
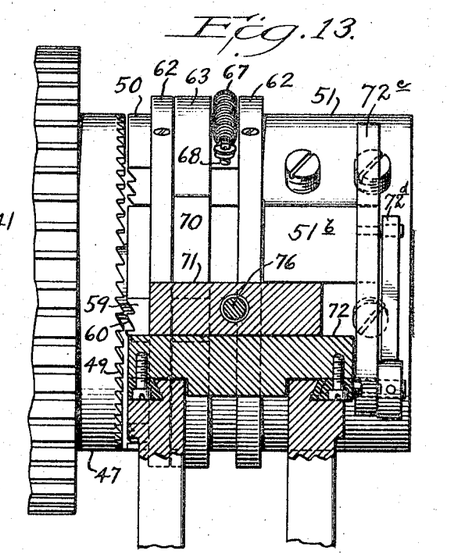
Figure 13 is a figure similar to Figure 12 with the parts shown in different positions.

As shown in Figure 11, the upright 42a on one side of the machine is spaced outwardly from the adjacent side frame to provide a suitable bearing 43 for the overhanging end of the cutter shaft 41. Said cutter shaft is also journalled within a bearing 44 in the side frame. Mounted on the lower cutter shaft 41 between the oppositely arranged side frames is a cutter roll 45 which carries a cutting blade 46, said blade being arranged askew on the outer periphery of said cutter roll in suitable position to cooperate at variably timed intervals with a corresponding cutter blade mounted upon a similar cutter roll carried by an upper cutter shaft to be presently referred to. As shown in Figure 11, the spur gear 40 is freely journalled upon the lower cutter shaft 41 and carries a clutch disk 47 which is secured to the lateral face of spur gear 40 by means of bolts 48. The clutch disk 47 is provided with an annular series of clutch teeth 49 which are adapted to interengage with similar teeth on suitable clutch blocks which are reciprocably mounted in the periphery of a cylindrical block or driven clutch member 50, said clutch member being axially spaced from the clutch disk 47 and freely journalled upon the lower cutter shaft 41. The clutch member 50 is provided with a cylindrical wall or extension 51 provided with oppositely arranged inwardly presented axial ribs 51a. Keyed to the lower cutter shaft within the cylindrical extension 51 is a cylindrical block 52 which is provided with oppositely arranged peripheral recesses 52a somewhat larger than the ribs 51a so as to permit a limited angular displacement between these parts. Mounted on the peripherally-separated portions of the block 52 are axially spaced friction bands 53 which cooperate with suitable friction straps 54 carried by the cylindrical extension 51 to provide a frictional drive connection between the clutch member 50 and the driven clutch block 52. Keyed to the lower cutter shaft 41 between the spur gear 40 and adjacent bearing, is a spur gear 55 which meshes into and drives a spur gear 56 which is keyed to the upper cutter roll shaft 57. The clutch member 50 is provided with a plurality of angularly spaced peripheral grooves or recesses 58 within which are reciprocably mounted clutch blocks 59, said clutch blocks being provided with teeth 60 adapted to interengage with the clutch teeth 49 on clutch disk 47. The clutch blocks 59 are provided with transverse slots 61 arranged at varying distances from the toothed ends of said blocks for adapting said blocks to interengage with the clutch disk 47 in diametrically opposed pairs depending upon the relative angular dispositions of the clutch members 47 and 50 at the particular moment the clutch becomes active. Secured to the outer periphery of the clutch member 50 are axially spaced bands 62. Laterally abutting one of said bands is an oscillatory cam ring 63 provided with inwardly presented cam blocks 64 which are adapted to engage in the transverse slots 61 of the clutch blocks 59. As shown in Figures 9 and 10, each of said cam blocks is provided with a cam surface 65 which is adapted to slidably engage a facet 66 on the corresponding clutch block 59. A helical spring 67 is arranged in the peripheral space formed between the oscillatory cam ring 63 and the other peripheral band 62, one end of said helical spring being connected to a radial post 68 on the clutch member 50 and the other end of said spring being connected to a laterally presented pin 69 which is carried by the oscillatory cam ring 63. As shown best in Figure 8, the cam ring 63 is provided with an outwardly presented dog or lug 70 beneath which is normally interposed a stop plate 71, said stop plate as shown best in Figures 8, 18 and 19, being adjustably mounted on a carriage comprising a reciprocable cross-head 72, laterally spaced guides 73, and a cover plate 74.

Rigidly secured to the outer periphery of the cylindrical portion 51 of the clutch is a plate or lug 51$^b$ which is arranged to come into positive abutment with the stop plate 71 after each operation of the cutting mechanism. As shown best in Figure 18, the cross-head 72 carries a laterally presented stud 72$^a$ upon which is pivotally mounted a latch-lever 72$^b$ provided with a claw 72$^c$. A leaf spring 72$^d$ is adapted to press the claw 72$^c$ toward the right according to Figure 1. The rearwardly-presented edge of claw 72$^c$ is provided with a cam-like edge so that as the plate or lug 51$^b$ on the outer periphery of the cylindrical portion 51 of the clutch is revolved in a counter-clockwise direction, said latch-lever is momentarily displaced but at the instant said plate or lug 51$^b$ is positively arrested by the stop plate 71, the claw 72$^c$ snaps into engagement with the upper corner of the lug 51$^b$ and thus locks the parts in readiness for the next operation. A lug or pin 72$^s$ is arranged in the path of a stop arm 72$^t$ of the latch-lever 72$^b$ and serves to prevent said latch-lever being unduly displaced with respect to the path of the plate or lug 51$^b$. The reciprocatory stop plate 71 is provided with a threaded socket into which screws the threaded end 76 of a rotary shaft 77, said rotary shaft being journalled in a bearing lug 78 presented upwardly from the reciprocatory cross-head 72 as shown in Figure 8. The shaft 77 is provided with axially spaced collars 80 on either side of bearing lug 78 so that whenever the cross-head 72 is moved toward the left according to Figure 8, the stop plate 71 will be withdrawn from the path of lug 70 and permit an action of the clutch which immediately throws the cutting blades into action. Said shaft has its forward end 81 provided with a rectangular cross-section mounted in a squared socket in a shaft 82. The shaft 82 is journalled in a bearing 83 carried by a bracket 84 and is held against axial displacement in said bearing by means of a collar 85 and the hub portion 86 of a sprocket wheel 87 which is secured to said shaft 82. The normal relative position of the stop plate 71 with respect to the dog or lug 70 carried by the oscillatory cam ring 63, may be adjusted to correspond to variations in speed of the variable speed power unit by the following connections.

*Stop plate adjustment mechanism*

Figure 4:
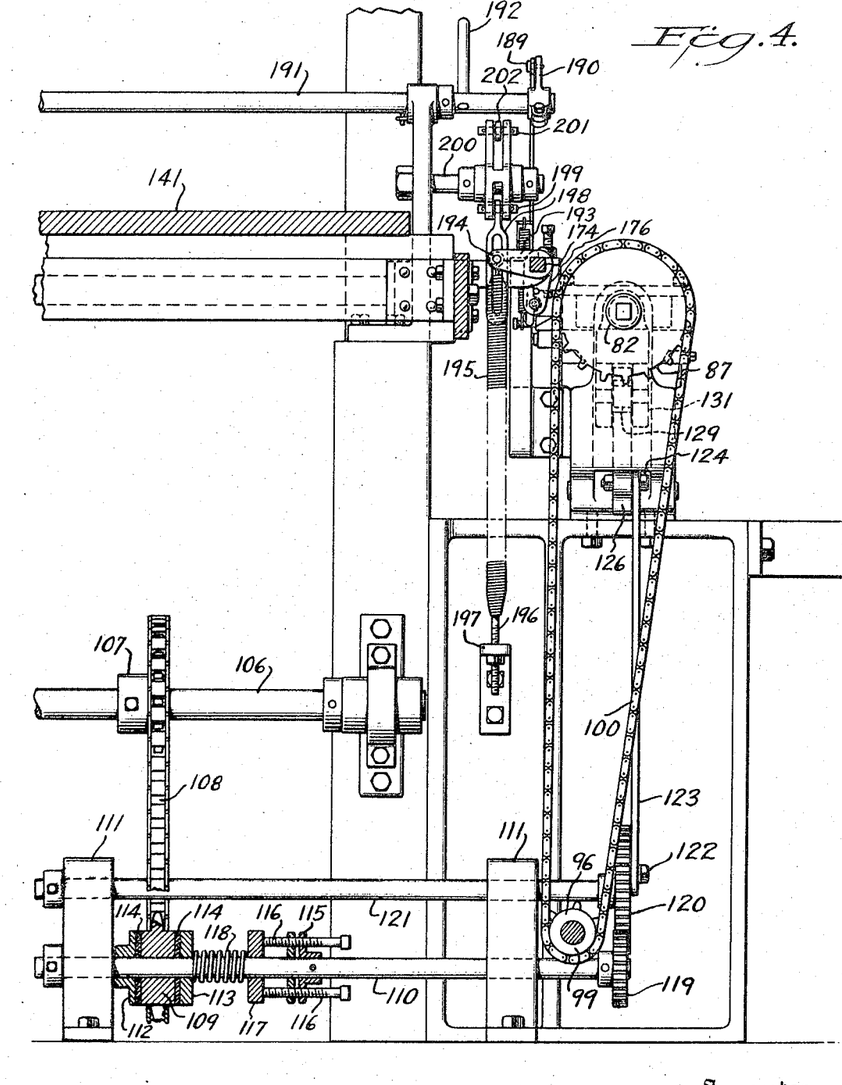
Figure 4 is a section on the line 4—4 of Figure 1.

Referring to Figure 2$^a$, the shift screw 14 for adjusting the speed ratio of transmission in the variable speed unit carries a miter gear 88 which meshes with a second miter gear 89 keyed to the upper end of a vertical shaft 90. The lower end of vertical shaft 90 carries a miter gear 91 (see Figure 1$^a$). Said miter gear 91 meshes with a miter gear 92 on a transverse shaft 93 which is provided with another miter gear 94 meshing with a miter gear 95 on the rear end of a horizontal shaft 96. Said horizontal shaft is journalled in bearing brackets 97 and 98 as shown in Figures 2$^a$ and 1. As shown in Figures 1 and 4, the shaft 96 carries near its forward end a sprocket wheel 99 over which runs a sprocket chain 100, said sprocket chain being arranged to transmit motion to the sprocket wheel 87 carried by the shaft 82 for adjusting the stop plate 71. It will be seen therefore that whenever the variable speed unit is adjusted, the stop-plate 71 will be advanced or retracted beneath the lug 70 to retard or advance the release of the clutch.

*Mechanism for reciprocating the stop plate*

As shown in Figure 3, the intermediate rotary shaft 36 carries a sprocket wheel 103 over which runs a sprocket chain 104. As shown in Figure 1, the sprocket chain 104 extends forwardly and runs over a sprocket wheel 105 which is keyed to a transverse shaft 106. Referring now to Figure 4, it will be seen that the shaft 106 carries a sprocket wheel 107 over which runs a sprocket chain 108, a sprocket wheel 109 being freely journalled upon a transverse shaft 110 which is journalled in laterally spaced standards 111. A fixed abutment disk 112 which is carried by the shaft 110 is spaced axially from a movable abutment disk 113, friction disks 114 being interposed between said abutment disks and the oppositely presented faces of the sprocket wheel 109. Secured to the shaft 110 is a flange 115 in which are threaded bolts or screws 116 which press upon a movable plate or disk 117. Interposed between the plate 117 and the adjacent abutment disk 113 is a compression spring 118 which is adapted to exert an adjustable pressure on the friction disks referred to. Keyed to the outer end of the shaft 110 is a spur gear 119 which meshes with a larger spur gear 120 mounted on a transverse shaft 121 which is also journalled in the standards 111. As shown in Figures 1 and 4, the spur gear 120 carries a crank pin 122 to which the lower end of a connecting rod 123 is pivoted. As shown best in Figure 8, the upper end of said connecting rod is pivoted at 124 to one arm 125 of a bell crank lever which is pivoted at 126. The other arm 127 of said bell crank lever is provided with a slot 128 within which travels a roller 129 which is journalled on a pin 130, said pin being presented laterally from a depending lug 131 on the reciprocatory cross-head 72. It will be understood from the foregoing description that while the shaft 106 is continuously rotated, the shaft 110 is held against rotation by reason of its positively geared connections with the reciprocatory cross-head 72. On the other hand, however, the frictional driving connection between the sprocket wheel 109 and shaft 110, adapts the latter to move the cross-head 72 toward the left according to Figure 8 whenever said cross-head is released by the web-controlled trip mechanism to be hereinafter described.

*Clutch trip control mechanism*

Figure 5:
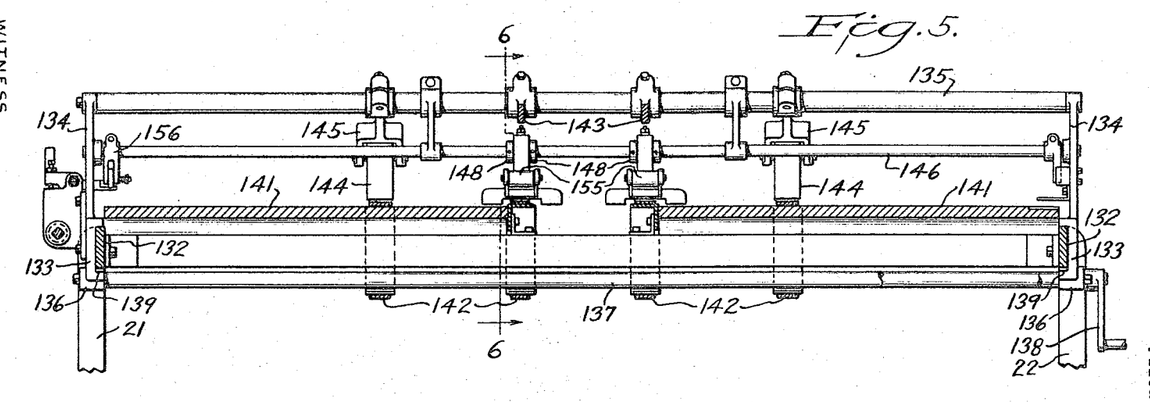
Figure 5 is a section on the line 5—5 of Figure 2.
Figure 14:
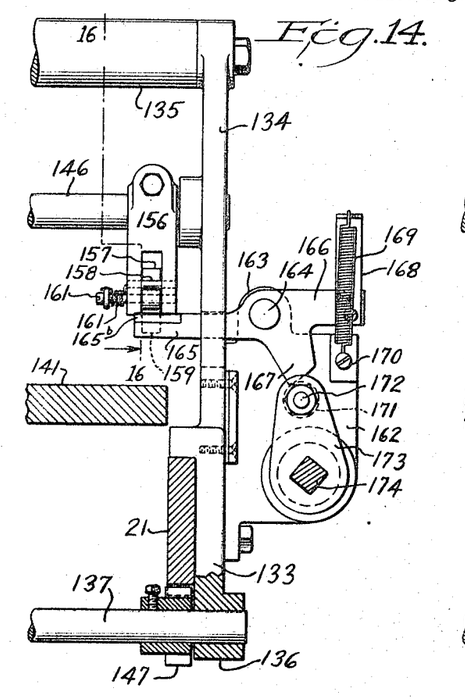
Figure 14 is an enlarged front elevation of the sheet controlled trip mechanism.
Figure 15:
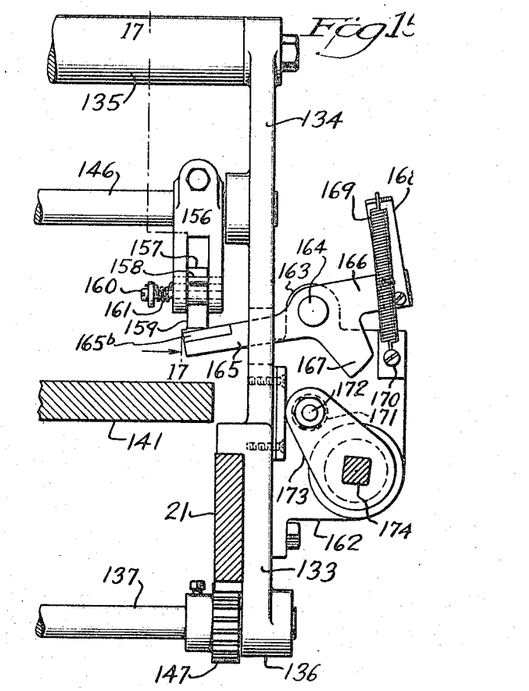
Figure 15 is a similar view of the same with the parts shown in changed positions.
Figure 16:
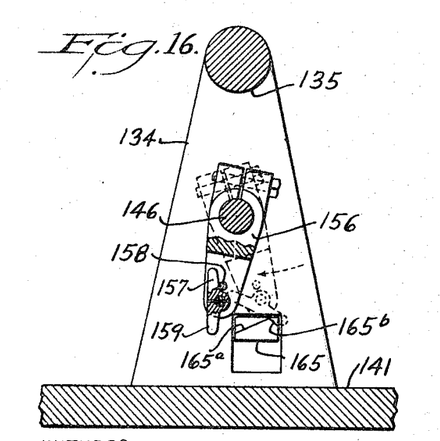
Figure 16 is a section on the line 16—16 of Figure 14.
Figure 17:
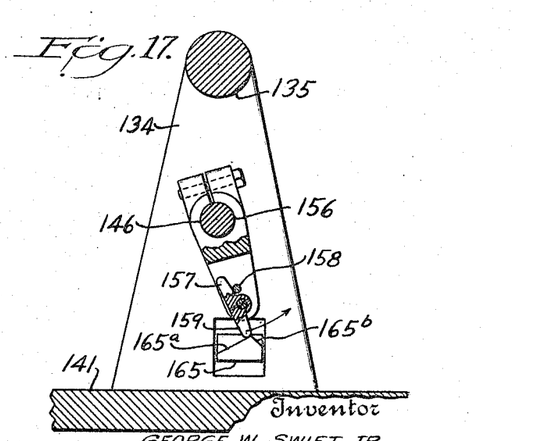
Figure 17 is a section on the line 17—17 of Figure 15.

Referring to Figures 1, 2 and 5, the laterally spaced side frames 21 and 22 serve to support the rear ends of guide rails 132 which extend forwardly from said side frames and serve to support a carriage upon which a web-actuated front gauge and trip operating mechanism are mounted. Slidable on said guide rails are plates or aprons 133 provided above with uprights 134 which are rigidly connected by a transverse bar 135. Journalled within suitable bearing lugs 136 which depend from the aprons 133 is a transverse shaft 137 which as shown in Figure 5 is provided at one end with a crank arm 138. As shown in Figure 1, each of the side rails 132 is provided with a longitudinal rack 139 into which mesh spur pinions 140 carried by the crank shaft 137. By means of this construction, the carriage may be adjusted longitudinally of a feed board or table 141. Movable forwardly over this feed table are laterally spaced web feeding tapes 142 which engage the under surface of the forwardly moving web. As shown in Figures 1 and 2, two rearwardly presented arms 143 carry in their bifurcated lower ends a pair of web controlling wheels 144, said wheels being respectively arranged above two of the feed tapes 142. Presented forwardly from the bar 135 are similar bracket arms 145 in the bifurcated lower ends of which are journalled other web controlling wheels 144. Oscillatably mounted in the uprights 134 is a rock shaft 146 and keyed to said rock shaft are a plurality of laterally spaced cross-head blocks 147 which are retained in position by means of paired collars 148 which are secured to said rock shaft on opposite sides of each of said blocks. Slidably mounted on each of the blocks 147 is a strap 149 (see Figures 6 and 7), a compression spring 150 being interposed between each block and the lower end of the strap which slides thereon. An adjusting screw 151 which is mounted in the upper end of the strap serves to adjust the position of said strap and to determine the tension of said spring. Secured to the front face of a depending flange 152 on each of said straps is a front gauge 153 which is arranged to be actuated by the forward edge of the web for operating certain connections whereby the normally held clutch is released to produce an operation of the cutter blades. Spaced above the tapes and at a suitable distance therefrom to provide a suitable guideway for the forward edge of the web, are arranged suitable guides 154 which extend rearwardly from the front gauges 153 toward anti-friction rollers 155, said rollers being suitably disposed as shown in Figure 7 to movably engage the web and to prevent an undue angular displacement of the strap 149. Keyed to the left end of rock shaft 146 according to Figure 5 as shown clearly in Figures 14 to 17 inclusive, is a slotted arm 156 and in the outer slotted end of this arm is pivoted a butterfly cam lever which comprises a detent arm 157 adapted to be engaged by a stop pin 158 and a cam arm 159 which during a movement in an anti-clockwise direction according to Figure 16 is adapted to depress one arm of a trip lever to be presently described. This cam lever is carried by a pintle 160 and under the tension of a torsion spring 161 is normally pressed against the stop pin 158. Presented outwardly from the adjacent plate or apron 133 and rigidly secured thereto is a plate or bracket 162 provided with a lug 163 for a stud 164. Oscillatably mounted on stud 164 is a trip lever comprising a cam arm 165, a spring arm 166 and a control arm 167. As shown in Figures 16 and 17, the outer end of the cam arm 165 is provided with a relatively broad cam surface 165$^a$ over which the cam arm 159 of the butterfly cam lever is adapted to slide in imparting a movement to the trip lever. Said cam arm 165 is also provided with a shorter cam surface 165$^c$ over which the cam arm 159 is adapted to drag on the return movement of slotted arm 156 as indicated in dotted lines in Figure 16. Referring now to Figures 14 and 15, the spring arm 166 of the trip lever carries a bracket 168 to which is connected one end of a spring 169, the other end of said spring being connected at 170 to the bracket 162. The spring 169 imparts a tendency to retain the trip lever in the position shown in Figure 14. In this position, the control arm 167 is arranged in the path of a cam roller 171 journalled on a pin 172 in the outer end of a rock arm 173, said rock arm being carried by a square rock shaft 174 which is reciprocable in a bushing and thereby journalled in the bracket plate 162.

Figure 18:
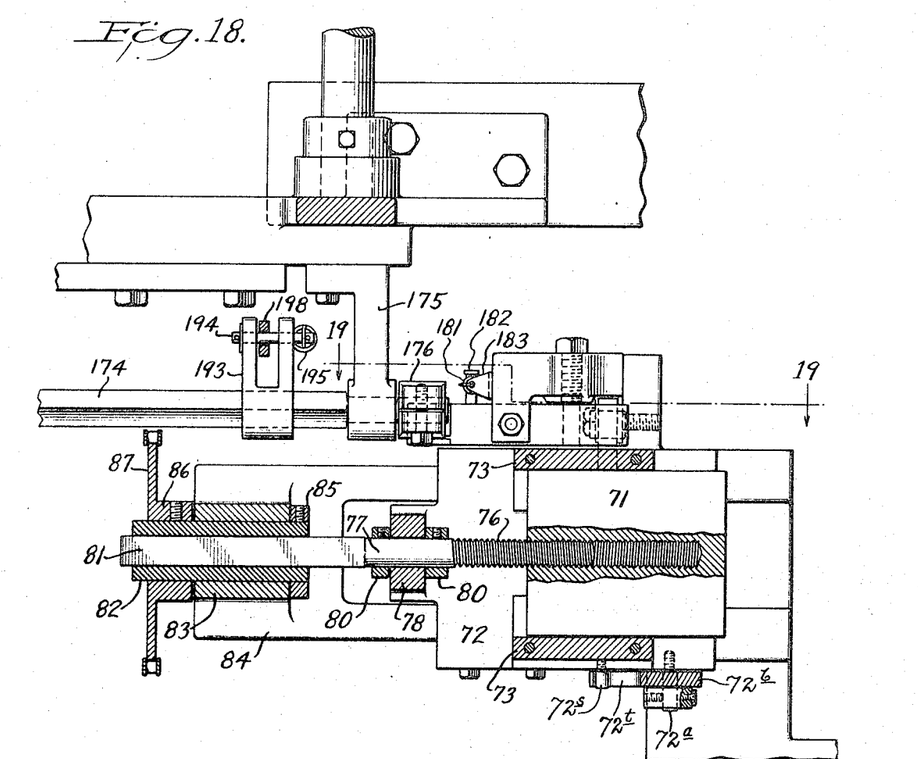
Figure 18 is an enlarged top plan view of the lower right-hand portion of Figure 2, parts being broken away and parts shown in section.
Figure 19:
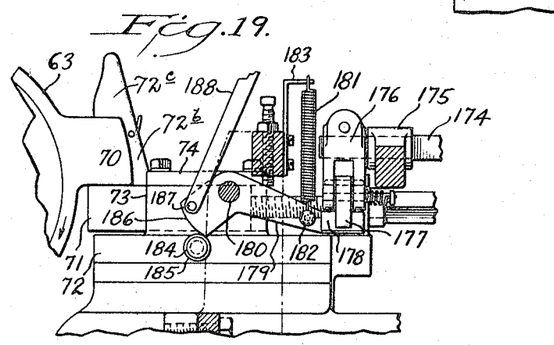
Figure 19 is a section on the line 19—19 of Figure 18.

Referring now more especially to Figures 18 and 19, the rearmost end of the rock shaft 174 which oscillates in a fixed bracket 175 carries a bifurcated lever arm 176 in the outer end of which is pivotally mounted a butterfly lever 177, these parts being similar in construction to the slotted arms 156 and the butterfly cam lever 157, 159, mounted therein as shown in Figures 16 and 17. The lower arm of said butterfly lever is adapted to wipe over a cam surface 178 with which one arm of a trip lever 179 is provided. Said trip lever is pivoted on a stud 180 and one end of a spring 181 is connected thereto at 182. The other end of said spring is connected to a fixed bracket 183, said spring being thereby adapted to exert a normal tendency to retain the trip lever in the position shown in Figure 19. Presented inwardly from one side of the carriage or cross-head 72, is a stud 184 upon which is journalled a cam roller 185. As shown in Figure 19, the trip lever 179 is provided with a cam arm 186 which is normally disposed in the reciprocatory path of the cam roller 185, said trip lever 179 being thus adapted to prevent a movement of the carriage or cross-head 72 toward the right according to Figure 19. It will be understood from this description that whenever the forward edge of the web effects a counter clockwise displacement of the trip lever according to Figure 15 the consequent release of the rock shaft 174 produces a clockwise movement of the trip lever 179 according to Figure 19 and thus removes the cam arm 186 from the path of the cam roller 185. This operation permits a sudden movement of the carriage 72 toward the right according to Figure 19 which retracts the stop plate 71 from the path of the lug 70 carried by the oscillatory ring which controls the clutch. The immediate effect of this operation is to throw in the clutch which in turn imparts a single revolution to the cutter blades for severing a certain predetermined length from the continuously moving web. Suitable means for effecting an emergency operation of this device by hand may be provided as follows. Referring to Figures 1 and 19, the cam arm 186 carries a laterally presented stud 187 to which the lower end of a connecting link 188 is connected. The upper end of said link is pivotally connected at 189 to a lever arm 190 which is mounted upon a rock shaft 191 provided with a hand lever 192 whereby the trip lever 179 may be operated at will to release the carriage 72. After each operation of the cutter blades, the clutch-trip control mechanism may be reset by the following device.

*Automatic reset mechanism for clutch trip*

Secured to the rock shaft 174 adjacent to the fixed bearing bracket 175, is a bifurcated arm 193 which carries a pin 194 to the outer end of which is secured the upper end of a spring 195. As shown in Figure 4, the lower end of this spring is connected to an adjusting screw 196 mounted in an angle bracket 197. Arranged between the opposite branches of the bifurcated arm 193 is a slotted link 198, the longitudinal slot therein as shown in Figure 4 being adapted with the pin 194 to provide a lost motion connection between the arm 193 and link 198. The upper end of link 198 is pivotally connected by a pin 199 to one arm of a bell crank lever which as shown in Figure 8 is pivotally mounted upon a stud 200. The other arm of said bell crank lever is pivotally connected by a pin 201 to one end of an extensible connecting rod 202. The other end of said connecting rod is connected to a crank pin 203 which projects laterally from the spur gear 56 on the upper cutter shaft 57.

*Operation*

While the operating functions of the several mechanisms included in the machine which has been shown and described as a practical embodiment of the principles underlying my invention have been pointed out, the operation of this machine in its entirety, may be described as follows.

In the particular machine shown on the drawings and described in the specification, a web of cardboard is fed continuously between intermittently operated shafts arranged on opposite sides of the web and adapted by the recurring operations of suitable trip mechanism under the control of a movable front gauge, to throw the cutter blades into action for cutting off successive portions or sections of substantially the same size. For this purpose, the following sequence of operations may be noted.

Figure 6:
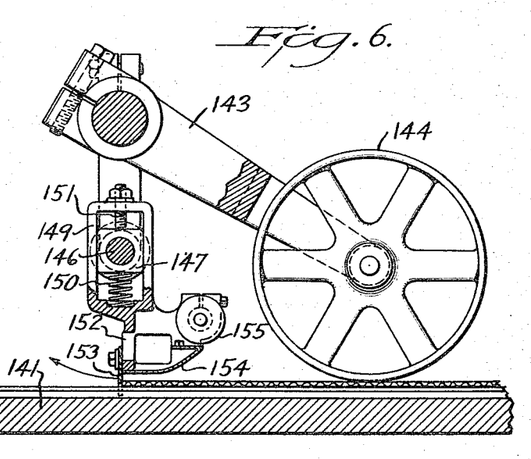
Figure 6 is a section on the line 6—6 of Figure 5.
Figure 7:
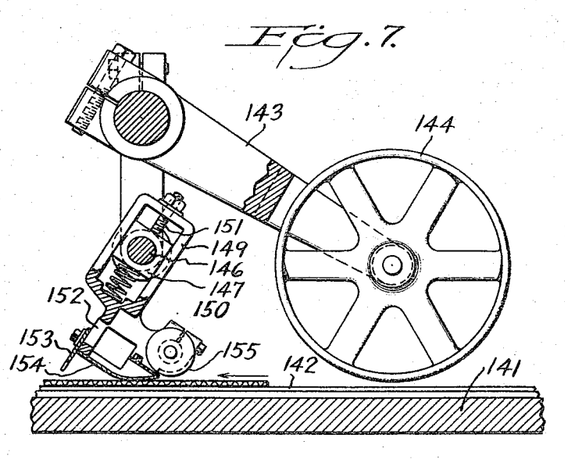
Figure 7 is a section similar to Figure 6 showing the parts in changed position.

As the forward edge of the continuously moving web comes into engagement with the front gauges 153 as indicated in Figure 6, said gauges are thrown in the direction indicated by the arrow in this figure. As indicated in Figures 16 and 17, the resulting counterclockwise movement of the rock-shaft 146 depresses the cam arm 165 and thus moves the control arm 167 from the path of rock arm 173 which is thus permitted to shift from its initial position shown in Figure 14 to its release position shown in Figure 15. It is this movement transmitted through the rock-shaft 174 which imparts a counterclockwise movement to the bifurcated lever arm 176 according to Figure 4. As shown in Figure 19, this movement depresses the right-hand arm of the trip lever which normally retains the cross-head or carriage 72 in its normal position of rest shown in Figures 8 and 19. This movement of the trip lever removes the cam arm 186 from the path of cam roller 185 journalled on the cross-head slide 72. Thereupon the bell-crank lever 125, 127, which is under a sustained tendency to move in a counterclockwise direction according to Figure 8 due to its operating connections with the friction driven shaft 110, is actuated to throw the cross-head or carriage 72 toward the left. This action removes the trip plate 71 out of the path of lug 70 on the oscillatory cam ring 63 which immediately renders the clutch active and produces an operation of the cutter blades. As the cutter blades are revolved, and while the severed portion of the web is being fed from the machine, the reset mechanism described above operates to return the rock-shaft 174 and related parts to initial position while at the same time the trip-plate 71 is returned to its initial position of rest to intercept the lug 70 which effects a release of the clutch and permits the revolving cutter blades to come to rest in readiness for another operation. As each portion or section is severed from the main body of the advancing web, it comes under the independent action of the feed tapes 142 which in conjunction with the guide pressure wheels 144 serve to accelerate the severed portion in such a way that the front gauges 153 are permitted to resume their initial position before the forward edge of the main web reaches said position. For this purpose, the cross-shaft 106 carries a sprocket wheel similar to sprocket wheel 107 but hidden thereby in Figure 1, said hidden sprocket wheel being connected by a sprocket chain 204 with a smaller sprocket wheel 205 which is keyed to a cross-shaft 206 for driving the feed tapes 142.

As explained in previous portions of the specification, the web-severing operations of the cutter-blades are initiated earlier for a relatively rapid operation of the machine and later for a relatively slow operation of the machine as determined by automatically positioned stop-plate 71 with respect to the lug 70 on the clutch-operating cam ring. Thus an adjustment in the speed of the variable speed transmission unit to accelerate the speed of the machine causes the stop-plate 71 to be retracted nearer to release position whereas a downward adjustment of the speed causes the stop-plate 71 to be introduced to a greater extent with respect to the lug 70. As a result of these arrangements and adjustments I have found that a continuing series of substantially the exact same length may be severed from a continuously moving web irrespective of the speed at which said web may be moving.

I claim:—

1. In a machine for severing successive portions from a continuous web, the combination with web-cutting mechanism, of means actuatable by the web from the same normal position of rest for all speeds of said web for controlling the operation of the cutting mechanism, operating connections for driving said web-cutting mechanism, said operating connections including variable speed transmission mechanism, and means variable with the variable speed mechanism for starting and stopping said web-cutting mechanism from and at a fixed position of rest.

2. In a machine of the character described, the combination of cutting mechanism for operating upon a travelling web, means actuatable by the web from a fixed position of rest and operable after variable amounts of movement for controlling the operation of said cutting mechanism, and means variable with the speed of the web for timing the actuation of said cutting mechanism by varying the distance over which said web-actuated means moves.

3. In a machine of the character described, the combination of cutting mechanism for operating upon a travelling web, means actuatable by the web and movable variable distances for controlling the operation of said cutting mechanism, and means for variably timing the actuation of said cutting mechanism by the adjustment of the distance over which said web-actuated means travels.

4. In a machine of the character described, the combination of cutting mechanism movable from a fixed normal position of rest for operating upon a traveling web, means actuatable by the web from a fixed position of rest and movable over variable distances for controlling the operation of said cutting mechanism, and means for variably timing the actuation of said cutting mechanism by the adjustment of said variable distances.

5. In a machine of the character described, the combination of cutting-off mechanism provided with a directly-connected normally inoperative clutch, variable speed transmission mechanism for delivering a continuous web to said cutting-off mechanism, operating connections between said variable speed transmission mechanism and said normally inoperative clutch, web-actuated means for controlling the operation of said clutch, means for varying the speed of said variable speed transmission mechanism, and means variable with the speed of said variable speed transmission mechanism for varying the time action of said clutch.

6. In cutting-off mechanism, the combination with cutting mechanism, of a clutch, a rotary ring for controlling the operation of said clutch, a reciprocatory slide adapted to interengage with said rotary ring in variable degree requiring a variable degree of movement for releasing said rotary ring, web-controlled means for controlling the rotary movements of said rotary ring, variable speed mechanism for driving said cutting mechanism, and means operable to correspond to changes in the speed of said variable speed mechanism for varying the degree of interengagement between said slide and rotary ring.

7. In cutting off mechanism, the combination with periodically operated cutting mechanism, of a one-revolution clutch connected to said cutting mechanism, variable speed mechanism connected to said clutch for driving said cutting mechanism, means including separable elements movable into and out of a variable degree of overlap for controlling the operation of said one-revolution clutch, means operated by the variable speed mechanism for adjusting the degree of overlap of said separable elements, and web-actuated means for controlling the separation of said separable elements.

8. In a machine of the character described, the combination of web-cutting mechanism, a one-revolution clutch connected to said web-cutting mechanism, variable speed means connected to said clutch for driving said web-cutting mechanism, means for controlling the operation of said clutch including normally interengaging elements adapted to be adjusted relatively to each other into and out of positions in which variable degrees of relative movement is required to separate them, means operated by the variable speed adjustment of said variable speed mechanism for imparting relative adjustment to said normally interengaging elements, and web-actuated means for controlling the separation of said normally interengaging elements.

9. In a machine of the character described, the combination with web-cutting mechanism, of variable speed means for driving said web-cutting mechanism, operating connections between said variable speed means and said web-cutting mechanism, said operating connections including a clutch for connecting and disconnecting said web-cutting mechanism, web-controlled tripping mechanism, a rotary ring for controlling the operation of said clutch, operating connections between said web-controlled tripping mechanism and said rotary ring, the last-mentioned operating connections including a reciprocatory slide adapted to be adjusted into more or less overlapping engagement with a projecting lug on said rotary ring, and means for adjusting said slide to correspond to variations in speed of the variable speed driving means.

10. In a machine of the character described the combination of cooperating cutter blades revolving about axes arranged on opposite sides of a continuously moving web, a clutch mounted on one of said axes for transmitting power to said revolving cutter blades, a stop for disengaging said clutch at a variably predetermined time for each revolution of the cutter blades, said cutter blades being thereby adapted to come to rest at a fixed normal position in respect to their cutting position, web-controlled tripping mechanism for controlling the movement of said stop, and means for adjusting the position of said stop.

11. In a machine of the character described, the combination of web-cutting mechanism normally in a fixed position of rest, variable speed means for driving said web-cutting mechanism, operating connections between said variable speed means and said web-cutting mechanism, said operating connections including a clutch, web-controlled tripping mechanism for throwing said clutch into operation after a variable period of delay, and means adjustable with changes of speed in the variable speed driving means for lengthening or shortening said period of delay.

12. In web-cutting mechanism, the combination with cooperating cutter blades revolving about axes arranged on opposite sides of a continuously moving web for cutting successive portions from said web, a clutch comprising separable parts through which power is transmitted to said shafts, a clutch-operating ring provided with a stop-lug, a slide movable into and out of the path of said stop lug, a trip-lever normally retaining said slide in the path of said stop-lug, and web-controlled means for controlling the operation of said trip-lever.

13. In web-cutting mechanism, the combination with cutter shafts arranged on opposite sides of a moving web, said cutter shafts being geared together to rotate in unison, a clutch mounted on one of said shafts, and comprising separable parts through which power is transmitted to said shafts, a clutch-operating ring rotatable with and relatively to one of said clutch-parts, said clutch-operating ring being provided with a stop-lug, a slide movable into and out of the path of said stop lug, a trip-lever normally retaining said slide in the path of said stop-lug, a front gauge disposed in the path of said moving web, and operating connections between said front gauge and said trip-lever.

14. In web-cutting mechanism, the combination with cutter shafts arranged on opposite sides of the path of a moving web, said cutter shafts being geared together to rotate in unison and provided with cutter blades adapted to cooperate with each other for cutting successive portions from said web, a clutch comprising separable parts through which power is transmitted to said shafts, a clutch-operating ring provided with a stop-lug, a slide movable into and out of the path of said stop-lug, a reciprocatory cross-head for moving said slide, an adjustable connection between said slide and cross-head, a trip-lever normally retaining said slide in the path of said stop-lug, and web-controlled means for controlling the operation of said rock shaft.

15. In web-cutting mechanism, the combination with cutter shafts arranged on opposite sides of a continuously moving web, said cutter shafts being geared together to rotate in unison and provided with cutter blades adapted to cooperate with each other for cutting successive portions from said web, a clutch mounted on one of said shafts, said clutch comprising separable parts through which power is transmitted to said shafts, a clutch-operating ring rotatable with one of said clutch-parts said clutch-operating ring being provided with a stop-lug, a slide movable into and out of the path of said stop-lug, a trip-lever normally retaining said slide in the path of said stop-lug, a rock shaft for operating said trip lever to release said slide, and web-controlled means for controlling the operation of said rock shaft.

16. In a machine of the character described, the combination with web-cutting mechanism, of a clutch for starting and stopping said web-cutting mechanism, variable speed transmission mechanism connected to said web-cutting mechanism through said clutch, means for adjusting said variable speed transmission mechanism, means for controlling the operation of said clutch, said means including a reciprocatory slide for preventing the operation of said clutch, means operated by said transmission adjusting means for adjusting the position of said slide, frictionally driven means for reciprocating said slide, a trip lever normally blocking a clutch-release movement of said slide, a front gauge disposed in the path of the web, and an operating connection between said front gauge and said trip-lever.

17. In a machine of the character described, the combination with web-cutting mechanism, of a clutch for starting and stopping said web-cutting mechanism, variable speed transmission mechanism connected to said web-cutting mechanism through said clutch, means for adjusting said variable speed transmission mechanism, a rotary clutch ring for controlling the operation of said clutch, said clutch ring being provided with a lug, a slide movable into and out of the path of said lug, a screw threaded into said slide, means for connecting said transmission adjusting means to said screw whereby the amount of said slide disposed in the path of said lug may be adjusted proportionately to the speed-adjustment of the variable speed transmission, a movable carriage for rotatably mounting said screw, and web-controlled means for timing the movements of said carriage.

18. In a machine of the character described, the combination with web-cutting mechanism, of a clutch for starting and stopping said web-cutting mechanism, variable speed transmission mechanism connected to said web-cutting mechanism through said clutch, means for adjusting said variable speed transmission mechanism, a clutch-trip connected to a yieldably-driven power-transmitting connection, means for connecting said transmission adjusting means to said clutch-trip for advancing or retarding the clutch-release action of said clutch-trip to correspond to the speed transmitted by the variable speed transmission, and web-controlled means connected to said clutch-trip for predetermining the time action of the web-cutting mechanism.

19. In a machine of the character described, the combination with web-cutting mechanism, of a clutch for starting and stopping said web-cutting mechanism, variable speed transmission mechanism connected to said web-cutting mechanism through said clutch, means for adjusting said variable speed transmission mechanism, a rotary clutch ring for controlling the operation of said clutch, said clutch ring being provided with an outwardly-presented lug, a slide movable radially into and out of the path of said lug, means for connecting said transmission adjusting means to said slide, a reciprocable cross-head in which said slide reciprocates, a yieldable drive for reciprocating said cross-head, a trip lever normally blocking the movement of said cross-head away from said rotary clutch ring, a front gauge disposed in the path of said web, and an operating connection between said front gauge and said trip-lever.

20. In a machine of the character described, the combination of cutting mechanism for intermittently operating upon a travelling web, said cutting mechanism having a fixed normal position of rest for all speeds of the web, means actuated by the web for controlling the operation of said cutting mechanism, and means for variably timing the response of said cutting mechanism to said control means in accordance with varying speeds of the web.

21. In a machine for severing successive portions from a continuous web, the combination of web-cutting mechanism having a fixed normal position of rest for all speeds of the web, a web-actuated target movable from a fixed position of rest, power-driven variable speed transmission mechanism connected to said web-cutting mechanism, means for adjusting the speed at which power is transmitted to said web-cutting mechanism by said variable speed transmission mechanism, means under the control of said web-actuated target and operable after a variable period of delay to release said web-cutting mechanism, and means under the control of said variable speed transmission adjusting means for varying the length of said period of delay.

22. In a machine for severing successive portions from a continuous web, the combination of web-cutting mechanism having a fixed normal position of rest for all speeds of the web, power-driven variable-speed transmission mechanism connected to said web-cutting mechanism, means for adjusting said variable-speed transmission mechanism for regulating the speed of said web-cutting mechanism, variably-positioned means for controlling the operation of said web-cutting mechanism, operating connections between the means for adjusting said variable-speed transmission mechanism and said variably-positioned means for timing the operation of said web-cutting mechanism, and web-actuated means for controlling the operation of said variably-positioned means.

23. In a web-cutting machine, the combination of one-revolution web-cutting mechanism, a clutch connected to said web-cutting mechanism, a variable speed drive connected to said web-cutting mechanism through said clutch, means for adjusting the speed of said variable speed drive, a variably positioned clutch-release trip for controlling the starting and stopping of said web-cutting mechanism, means operated by said speed-adjusting means for timing the release of said clutch-release trip, and web-actuated means for controlling the release of said clutch-release trip.

24. In a machine for severing successive portions from a continuous web, the combination of web-cutting mechanism having a fixed normal position of rest for all speeds of the web, a clutch connected to said web-cutting mechanism, a clutch-release trip connected to said clutch for controlling the starting and stopping of said web-cutting mechanism, power-driven variable-speed transmission mechanism connected to said clutch, means for adjusting the speed of said variable speed transmission mechanism, variably-positioned means for controlling the operation of said clutch-release trip, means operated by said speed-adjusting means for adjusting said variably-positioned means, and web-actuated means for controlling the release of said clutch-release trip by said variably-positioned means.

GEORGE W. SWIFT, Jr.